(12) United States Patent
Lee et al.

(10) Patent No.: US 12,106,006 B2
(45) Date of Patent: Oct. 1, 2024

(54) DISPLAY DEVICE

(71) Applicant: LG ELECTRONICS INC., Seoul (KR)

(72) Inventors: Donghee Lee, Seoul (KR); Daegun Park, Seoul (KR); Beduero Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/909,522

(22) PCT Filed: Mar. 26, 2020

(86) PCT No.: PCT/KR2020/004076
§ 371 (c)(1),
(2) Date: Sep. 6, 2022

(87) PCT Pub. No.: WO2021/193991
PCT Pub. Date: Sep. 30, 2021

(65) Prior Publication Data
US 2023/0297311 A1    Sep. 21, 2023

(51) Int. Cl.
*G06F 3/14*  (2006.01)
*G06F 1/18*  (2006.01)
(Continued)

(52) U.S. Cl.
CPC ............ *G06F 3/1454* (2013.01); *G06F 1/181* (2013.01); *G06F 11/3055* (2013.01); *H02J 50/80* (2016.02); *H04L 5/0055* (2013.01)

(58) Field of Classification Search
None
See application file for complete search history.

(56) References Cited

U.S. PATENT DOCUMENTS 9,389,643 B1 *   7/2016  Clark ................. G06F 1/1637
2013/0326104 A1 * 12/2013  Strommen ........... G06F 1/1692
710/304
(Continued)

FOREIGN PATENT DOCUMENTS

EP    3 139 264 A2   3/2017
EP    3 200 467 A1   8/2017
(Continued)

*Primary Examiner* — Ryan M Gray
(74) *Attorney, Agent, or Firm* — Birch, Stewart, Kolasch & Birch, LLP (57) ABSTRACT

A display device including a display, a communication interface configured to perform communication with a mobile terminal, a charging module configured to charge the mobile terminal, and a processor configured to detect a start of charging of the mobile terminal through the charging module, receive a screen state of the mobile terminal from the mobile terminal, determine whether a screen of the mobile terminal is turned on or turned off, based on the received screen state, if the screen of the mobile terminal is determined to be on, transmit a screen mirroring request to the mobile terminal, receive, from the mobile terminal, image data corresponding to an image being displayed by the mobile terminal, in response to the screen mirroring request, and display a mirrored image on the display based on the received image data, and if the screen of the mobile terminal is determined to be off, transmit a screen mirroring notification to the mobile terminal inquiring whether to perform screen mirroring through the communication interface to the mobile terminal.

20 Claims, 8 Drawing Sheets

(51) Int. Cl.
    *G06F 11/30*     (2006.01)
    *H02J 50/80*     (2016.01)
    *H04L 5/00*     (2006.01)

(56) References Cited

U.S. PATENT DOCUMENTS

| | | | |
|---|---|---|---|
| 2013/0328878 A1* | 12/2013 | Stahl | G09G 5/005 |
| | | | 345/1.3 |
| 2014/0307040 A1* | 10/2014 | Choi | H04W 80/04 |
| | | | 709/217 |
| 2018/0335939 A1* | 11/2018 | Karunamuni | G06F 8/38 |
| 2019/0265938 A1* | 8/2019 | Kim | G06F 3/1423 |

FOREIGN PATENT DOCUMENTS

| | | | |
|---|---|---|---|
| JP | 2013-232791 A | 11/2013 | |
| KR | 10-2014-0042435 A | 4/2014 | |
| KR | 10-1607379 B1 | 3/2016 | |
| KR | 10-2016-0073481 A | 6/2016 | |
| KR | 10-2017-0045528 A | 4/2017 | |

\* cited by examiner

DISPLAY DEVICE

CROSS-REFERENCE TO RELATED APPLICATION

This Application is the National Phase of PCT International Application No. PCT/KR2020/004076 filed on Mar. 26, 2020, which is hereby expressly incorporated by reference into the present application.

BACKGROUND OF THE INVENTION

Field of the Invention

The present disclosure relates to a display device, and more particularly, to a display device interworking with a mobile terminal.

Discussion of the Related Art

The functions of terminals are diversifying and include data and voice communication, photo and video shooting through a camera, voice recording, music file play back through a speaker system, and output of images or videos to a display. Some terminals have an electronic game play function or perform a multimedia player function.

As the functions of the terminal are diversified, the terminals are implemented in the form of a multimedia device equipped with complex functions such as, for example, shooting pictures or moving images, playing music, or moving image files, games, receiving broadcasts, or the like. In particular, a screen mirroring function for sharing a screen between terminals has been utilized recently.

The screen mirroring function displays an image being displayed on a small-screen terminal on a large-screen terminal. For screen mirroring, a user needs to perform a complicated process of selecting and registering devices to interwork with each other. That is, extensive user input is required for interworking between devices, which is inconvenient for the user.

SUMMARY OF THE INVENTION

Accordingly, an object of the present invention is to address the above-noted and other problems.

Another object of the present disclosure is to detect charging of a mobile terminal and control the mobile terminal to automatically interwork with a display device.

Still another object of the present disclosure is to detect the start of charging of a mobile terminal and immediately display an image being displayed in the mobile terminal on a display device. To achieve these and other advantages and in accordance with the purpose of the present invention, as embodied and broadly described herein, the present invention provides in one aspect a display device including a display, a communication interface configured to perform communication with a mobile terminal, a charging module configured to charge the mobile terminal, and a processor configured to, when start of charging of the mobile terminal is detected through the charging module, receive a screen state of the mobile terminal from the mobile terminal, when it is determined that a screen of the mobile terminal is turned on, based on the screen state, transmit a screen mirroring request to the mobile terminal, receive, from the mobile terminal, image data corresponding to an image being displayed by the mobile terminal, in response to the screen mirroring request, and display a mirrored image on the display based on the received image data.

Advantageous Effects

According to various embodiments of the present disclosure, it is possible to omit a process in which the user needs to approve for interworking with the mobile terminal, thus greatly improving user convenience. In addition, the user can seamlessly watch an image being viewed through the mobile terminal through the large screen only by charging the mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the preferred embodiments of the present invention, examples of which are illustrated in the accompanying drawings.

Figure 1:
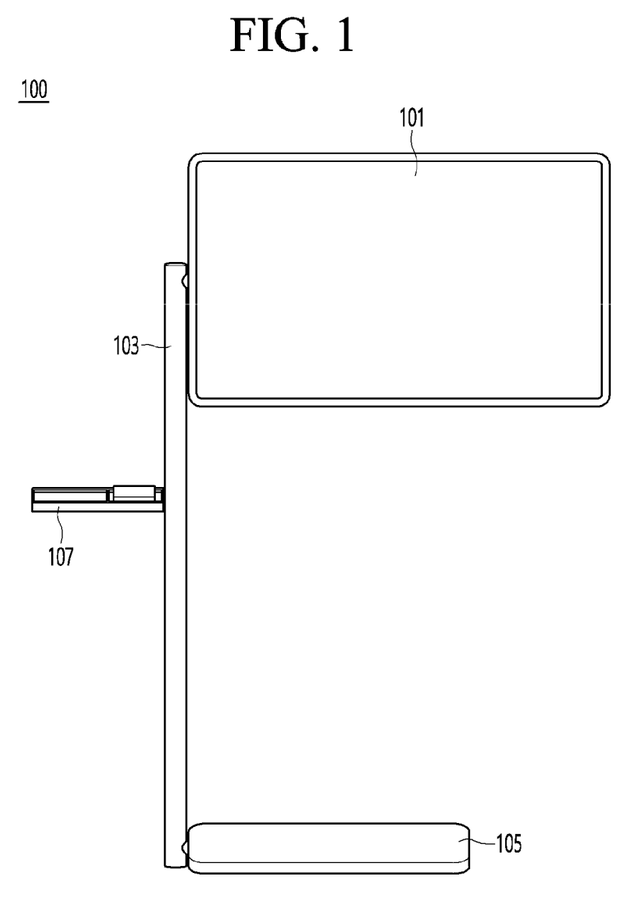
FIG. 1 is an overview illustrating a display device according to an embodiment of the present disclosure.

FIG. 1 is a diagram illustrating a display device 100 according to an embodiment of the present disclosure. Further, the display device 100 may be a TV, a mobile phone, a smartphone, a desktop computer, a notebook, a digital broadcasting terminal, a personal digital assistant (PDA), a portable multimedia player (PMP), a navigation device, a tablet PC, a wearable device, a desktop computer, a digital signage, and the like. The display device 100 can also be easy for a user to move. For example, a stand base 105 of the display device 100, which will be described later, can include wheels to facilitate easy movement.

Referring to FIG. 1, the display device 100 includes a head 101, a shaft 103, a stand base 105, and a cradle 107. The head 101 is spaced apart from the stand base 105 in an upper direction and includes a display 151 (FIG. 2) and a back cover surrounding the periphery of the display 151.

In addition, a shaft 103 connects the head 101 and the stand base 105 and extends vertically. The lower end of the shaft 103 is connected to an edge of the stand base 105. Specifically, the lower end of the shaft 103 is rotatably connected to the edge of the stand base 105. Accordingly, the head 101 and the shaft 103 can rotate about an axis perpendicular to the stand base 105.

Further, the upper portion of the shaft 103 is connected to a peripheral portion of the head 101 and faces the peripheral portion of the head 101 in a horizontal direction. In more detail, a horizontally protruding connection pin is formed in the upper portion of the shaft 103, and connected to the peripheral portion of the head 101. The head 101 can thus be tilted about a horizontal axis corresponding to the connection pin.

In addition, the stand base 105 supports the display device 100, and the cradle 107 can be used to hold the user's belongings, such as a user's smartphone, a cup, and the like. The cradle 107 is connected to one portion of the shaft 103 and is horizontally disposed.

A height from the stand base 105 to the cradle 107 can be lower than a height from the stand base 105 to the head 101. Further, the cradle 107 can be positioned opposite the head 101 with respect to the shaft 103. In more detail, the head 101 can be connected to one side of the shaft 103, and the cradle 107 may be connected to the other side of the shaft 103. Accordingly, the user can easily mount his belongings on the cradle 107 without being disturbed by the head 101.

Figure 2:
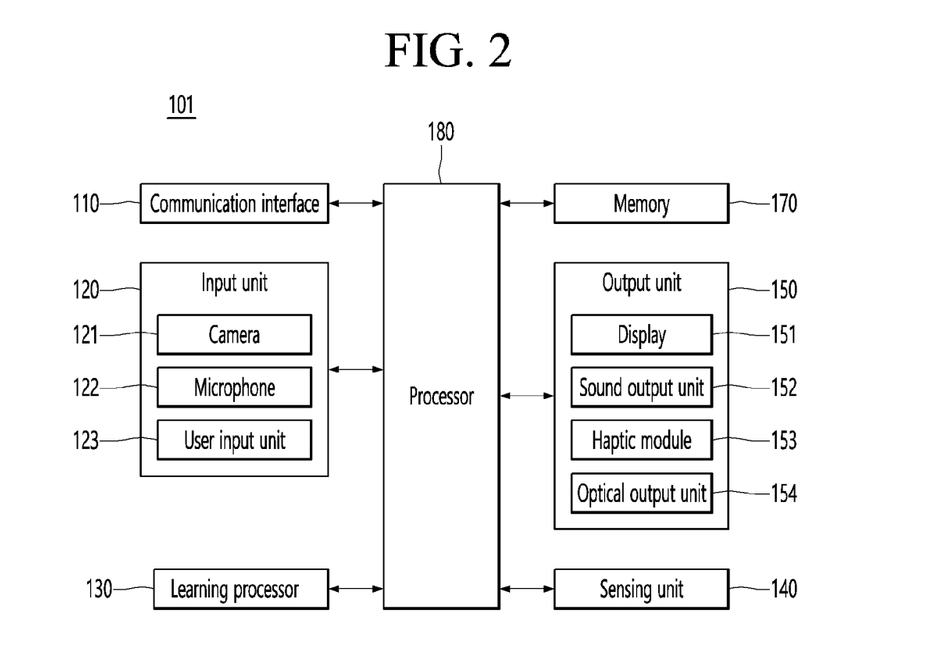
FIG. 2 is a block diagram illustrating a display device according to an embodiment of the present disclosure.

Next, FIG. 2 is a block diagram illustrating a display device according to an embodiment of the present disclosure. In particular, the components of FIG. 2 can be provided in the head 101 of FIG. 1. Referring to FIG. 2, the display device 100 includes a communication unit 110, an input unit 120, a learning processor 130, a sensing unit 140, an output unit 150, a memory 170, and a processor 180. The communication unit 110 can transmit/receive data to and from external devices such as other terminals or external servers using wired/wireless communication technologies. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

Further, the input unit 120 can acquire various kinds of data and can include a camera 121 for input of an image signal, a microphone 122 for receiving an audio signal, and a user input unit 123 for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using learning model. The input unit 120 can also acquire raw input data. Further, the processor 180 or the learning processor 130 can extract an input feature by preprocessing the input data. As described above, the input unit 120 can include the camera 121 for inputting an image signal, the microphone 122 for receiving an audio signal, and the user input unit 123 for receiving information from a user.

The speech data or image data collected by the input unit 120 can be analyzed and processed as a control command of the user. The input unit 120 is for inputting image information (or signal), audio information (or signal), data, or information input from a user. To input image information, the display device 100 can include one or a plurality of cameras 121. The camera 121 processes image frames such as still images or moving images obtained by an image sensor in a video call mode or a photographing mode. The processed image frames can be displayed on the display unit 151 or stored in the memory 170.

In addition, the microphone 122 processes external sound signals as electrical speech data. The processed speech data can be utilized in various ways according to a function (or running application program) being performed in the display device 100. Various noise reduction algorithms can also be applied in the microphone 122 to remove noise occurring in the process of receiving an external sound signal.

Further, the user input unit 123 is for receiving information from a user. When information is input through the user input unit 123, the processor 180 can control the operation of the display device 100 to correspond to the input information. The user input unit 123 may include mechanical input mechanism (or a mechanical key, for example, a button, a dome switch, a jog wheel, or a jog switch located at the front/rear or side of the display device 100) and touch input. As an example, the touch input includes a virtual key, a soft key, or a visual key displayed on the touch screen through software processing, or a touch key disposed in the other portion than the touch screen.

The learning processor 130 can learn a model composed of an artificial neural network by using learning data. In more detail, the learned artificial neural network can be referred to as a learning model used to an infer result value for new input data rather than learning data, and the inferred value can be used as a basis for determination to perform a certain operation.

Further, the learning processor 130 may include a memory integrated or implemented in the display device 100. Alternatively, the learning processor 130 can be implemented by using the memory 170, an external memory directly connected to the display device 100, or a memory held in an external device.

In addition, the sensing unit 140 can acquire at least one of internal information about the display device 100, ambient environment information about the display device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 can generate an output related to a visual sense, an auditory sense, or a haptic sense. Further, the output unit 150 may include a display unit for outputting time information, a speaker for outputting auditory information, and a haptic module for outputting haptic information.

As shown, the output unit 150 may include at least one of a display unit 151, a sound output unit 152, a haptic module 153, and an optical output unit 154. In more detail, the display unit 151 displays (outputs) information processed by the display device 100. For example, the display unit 151 can display execution screen information of an application program running on the display device 100, or UI (User Interface) or Graphic User Interface (GUI) information according to the execution screen information.

The display unit 151 can also include a touch screen so the display unit 151 forms a layer structure with or is integrally formed with a touch sensor. Such a touch screen can function as a user input unit 123 providing an input interface between the display device 100 and the user and can also provide an output interface between the terminal 100 and the user at the same time.

The sound output unit 152 outputs audio data received from the communication unit 110 or stored in the memory 170 in a call signal reception, a call mode or a recording mode, a speech recognition mode, a broadcast reception mode, or the like. The sound output unit 152 may include at least one of a receiver, a speaker, and a buzzer.

In addition, the haptic module 153 generates various tactile effects that a user can feel. A representative example of the tactile effect generated by the haptic module 153 includes vibration. Further, the optical output unit 154 outputs a signal for notifying occurrence of an event by using light of a light source of the display device 100. Examples of events generated by the display device 100 include message reception, call signal reception, a missed call, an alarm, schedule notification, email reception, and information reception through an application, and the like.

Further, the memory 170 can store data that supports various functions of the display device 100. For example, the memory 170 can store input data acquired by the input unit 120, learning data, a learning model, a learning history, and the like. The processor 180 can also determine at least one executable operation of the display device 100 based on information determined or generated by using a data analysis algorithm or a machine learning algorithm. The processor 180 also controls the components of the display device 100 to execute the determined operation.

In particular, the processor 180 can request, search, receive, or utilize data of the learning processor 130 or the memory 170. The processor 180 can also control the components of the display device 100 to execute the predicted operation or the operation determined to be desirable among the at least one executable operation.

When the connection of an external device is required to perform the determined operation, the processor 180) can generate a control signal for controlling the external device and may transmit the generated control signal to the external device. The processor 180 can also acquire intention information for the user input and may determine the user's requirements based on the acquired intention information.

Further, the processor 180 can acquire the intention information corresponding to the user input by using at least one of a speech to text (STT) engine for converting speech input into a text string or a natural language processing (NLP) engine for acquiring intention information of a natural language. At least one of the STT engine or the NLP engine can be configured as an artificial neural network, at least part of which is learned according to the machine learning algorithm. At least one of the STT engine or the NLP engine can also be learned by the learning processor 130, learned by an external server, or learned by their distributed processing.

In addition, the processor 180 can collect history information including the operation contents of the display device 100 or the user's feedback on the operation and store the collected history information in the memory 170 or the learning processor 130 or transmit the collected history information to the external device such as the external server. The collected history information can also be used to update the learning model.

Further, the processor 180 can control at least part of the components of the display device 100 to drive an application program stored in the memory 170. Furthermore, the processor 180 can operate two or more of the components included in the display device 100 in combination to drive the application program.

Figure 3:
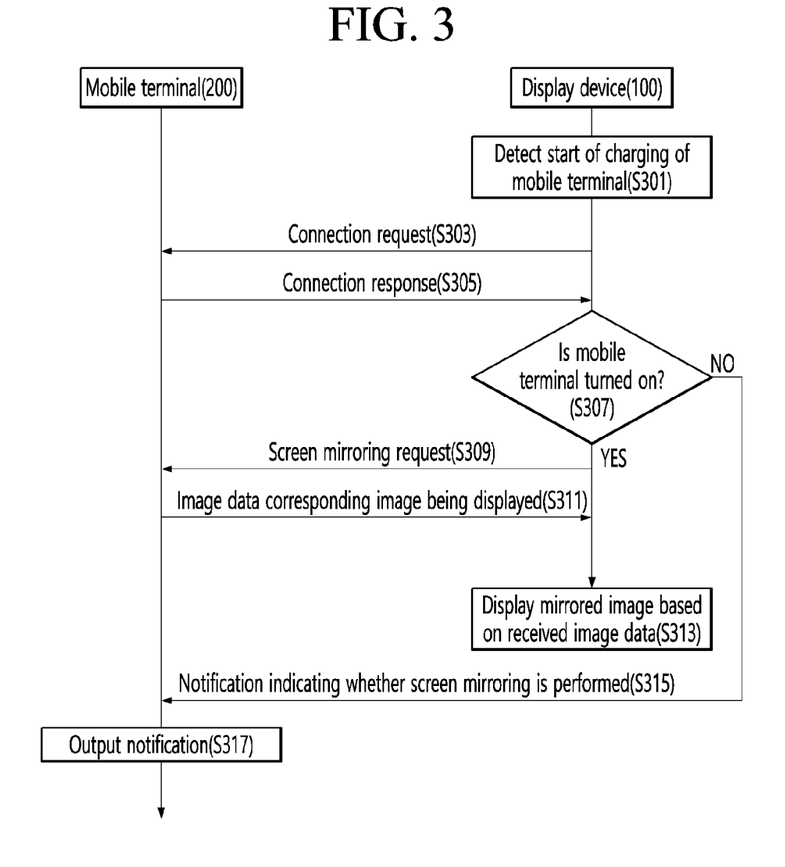
FIG. 3 is a ladder diagram illustrating a method of operating a system according to an embodiment of the present disclosure.

Next, FIG. 3 is a ladder diagram illustrating a method of operating a system according to an embodiment of the present disclosure. In particular, FIG. 3 illustrates the display device 100 detecting a charging state of a mobile terminal 200 and automatically interworking with the mobile terminal 200.

In addition, a system according to an embodiment of the present disclosure includes one or more mobile terminals 200 and a display device 100. The mobile terminal 200 can include the components described in FIG. 2 and be a smartphone, a tablet, and a smart watch.

Referring to FIG. 3, the processor 180 of the display device 100 detects the start of charging of the mobile terminal 200 (S301). In an embodiment, the processor 180 can detect the start of charging of the mobile terminal 200 through a charging module provided in the cradle 107 of the display device 100. The charging module can charge the mobile terminal 200 in a wired charging method or a wireless charging method.

When a wireless charging method is used, a magnetic induction or magnetic resonance method can be used. When the charging module charges the mobile terminal 200 in a wireless charging method, the mobile terminal 200 and the charging module can include one or more coils for magnetic induction or magnetic resonance. The charging module can transmit a charging start signal to the processor 180 of the display device 100 when the mobile terminal 200 is mounted on the charging module. The charging module can also detect the flow of current and generate the charging start signal.

Further, the processor 180 of the display device 100 can detect the start of charging of the mobile terminal 200 based on the charging start signal and when the mobile terminal 200 is placed on the cradle 107 and starts to be charged.

The processor 180 of the display device 100 can also transmit a connection request to the mobile terminal 200 through the communication interface 110 according to the charging start detection (S303), and receive a connection response in response to the connection request from the mobile terminal 200 (S305). The processor 180 can transmit the connection request for attempting a wireless connection with the mobile terminal 200 to the mobile terminal 200 through the communication interface 110 according to the detection of the start of charging of the mobile terminal 200.

In particular, the communication interface 110 can include a short-range communication processor for a short-range communication standard of any one of Wi-Fi and Bluetooth. The mobile terminal 200 can transmit a connection response permitting a connection to the display device 100 in response to the connection request received from the display device 100.

The connection response can include a screen state of the mobile terminal 200. In particular, the screen state of the mobile terminal 200 indicates whether a screen is turned on or off. The processor 180 of the display device 100 can thus determine whether the screen of the mobile terminal 200 is turned on based on the connection response (S307).

In particular, the processor 180 can determine whether the screen of the mobile terminal 200 is turned on or off by using the screen state of the mobile terminal 200 included in the connection response. When the screen of the mobile terminal 200 is turned on (Yes in S307), the processor 180 of the display device 100 transmits a screen mirroring request for screen sharing to the mobile terminal 200 through the communication interface 110 (S309).

When that the processor 180 determines the screen is turned on based on the screen state of the mobile terminal 200 included in the connection response, the processor 180 can transmit the screen mirroring request to the mobile terminal 200. The screen mirroring request is a screen sharing request requesting the display device 100 to display a same image being displayed by the mobile terminal 200. This is because the user generally wants to view an image displayed by the mobile terminal 200 through the display device 100 when the mobile terminal 200 is placed on the mount holder 107 with a charging function, and the screen of the mobile terminal 200 is in a turned-on state.

In addition, the processor 180 of the display device 100 can receive image data corresponding to the image being displayed by the mobile terminal 200 from the mobile terminal 200 in response to the screen mirroring request (S311). In more detail, the mobile terminal 200 can transmit the image data corresponding to the image displayed on the screen to the display device 100. The processor 180 of the display device 100 can thus display a mirrored image on the display 151 based on the received image data (S313). The processor 180 can also convert the image data to match the resolution of the display device 100 based on the image data received from the mobile terminal 200, and display a mirrored image on the display 151 by using the converted image data.

When the screen of the mobile terminal 200 is determined to be turned off (No in S307), the processor 180 of the display device 100 can transmit a notification inquiring whether to perform screen mirroring for screen sharing to the mobile terminal 200 (S315). The reason for this is because the screen of the mobile terminal 200 being turned off can be interpreted as the user places the mobile terminal 200 on the cradle 107 only for charging.

As another example, when the screen of the mobile terminal 200 is turned off, the processor 180 of the display device 100 can transmit a notification event provision request requesting the mobile terminal 200 to provide a notification event received. The reason for this is that the user has a need to check a notification received by the mobile terminal 200 through the display device 100 when the screen of the mobile terminal 200 is turned off and the mobile terminal 200 is being charged.

In addition, the mobile terminal 200 can output a notification received from the display device 100 (S317). For example, the mobile terminal 200 can output the notification through a speaker or display the notification through a display.

Figure 4A:
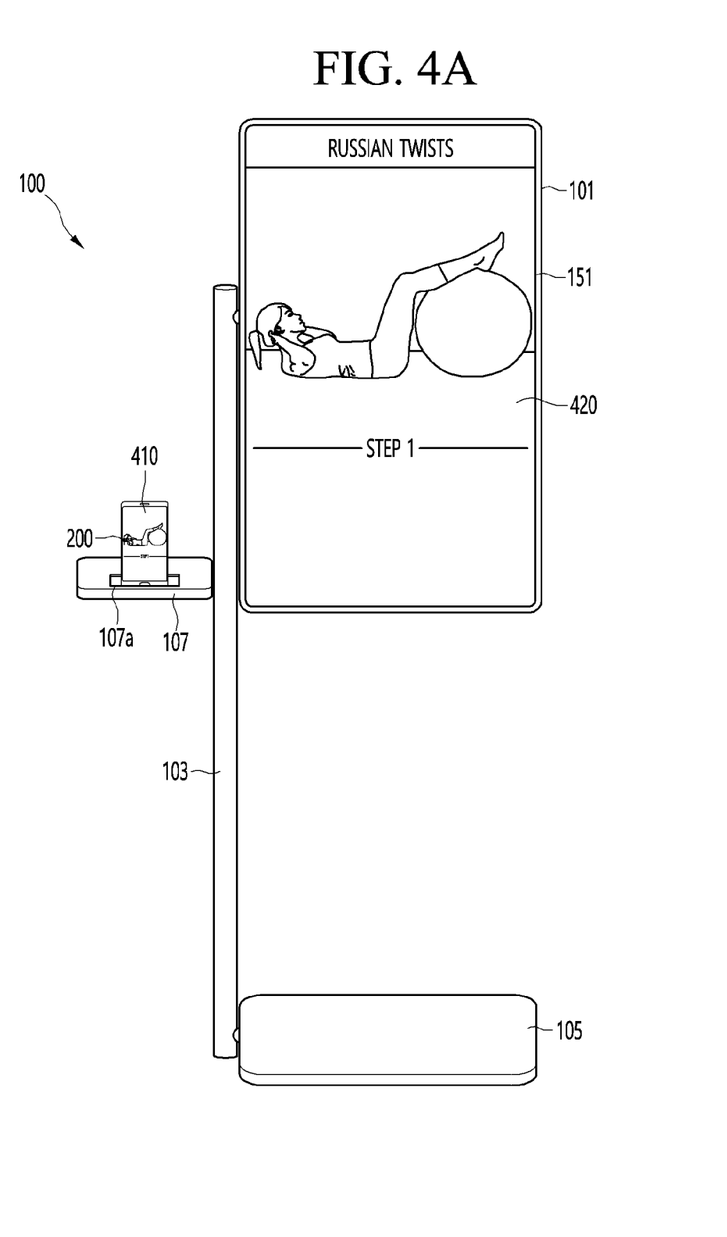
FIGS. 4A to 4C are overviews illustrating a display device and a mobile terminal automatically interworking with each other based on starting the charging of the mobile terminal according to an embodiment of the present disclosure.
Figure 4B:
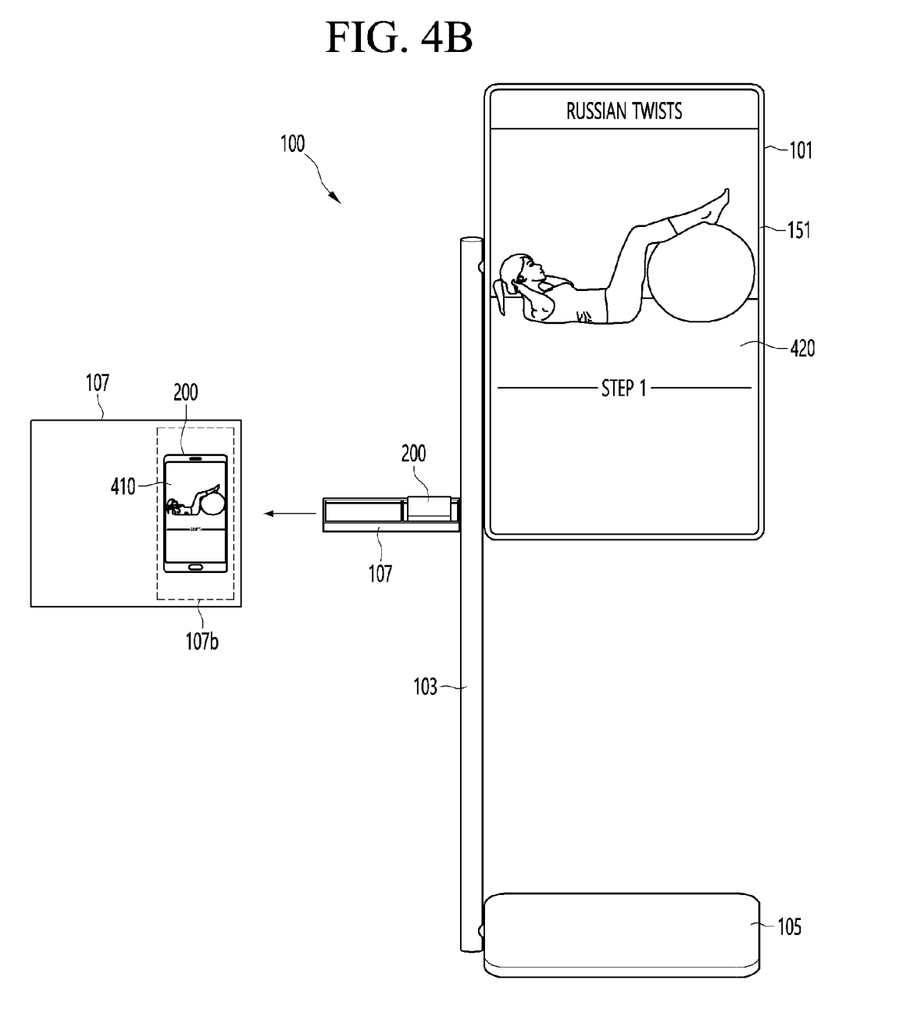
Figure 4C:
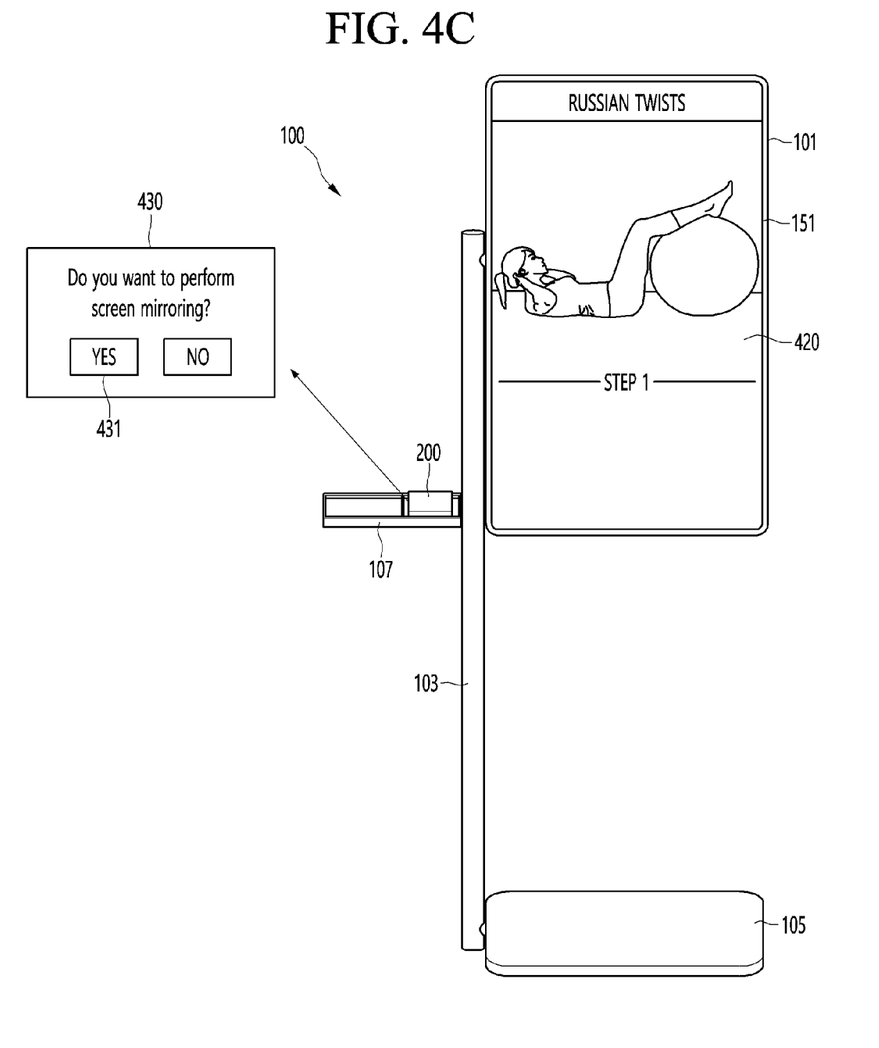

FIGS. 4A to 4C are overviews illustrating a display device and a mobile terminal automatically interworking with each other according to the detection of the start of charging of the mobile terminal according to an embodiment of the present disclosure. FIGS. 4A and 4B illustrate the screen of the mobile terminal 200 is turned on, and FIG. 4C illustrates the screen of the mobile terminal 200 is turned off.

In addition, FIG. 4A illustrates the mobile terminal 200 is charged through a wired charging module 107a provided in the cradle 107, and FIG. 4B illustrates the mobile terminal 200 is charged through a wireless charging module 107b provided in the cradle 107. That is, FIG. 4A illustrates the cradle 107 of the display device 100 includes a wired charging module 107a for wired charging.

When the mobile terminal 200 is mounted on the wired charging module 107a, the wired charging module 107a can detect when a current is transmitted to the mobile terminal 200 and generate a charging start signal. The wired charging module 107a can also transmit the charging start signal to the processor 180 of the display device 100.

The processor 180 of the display device 100 can thus detect the start of charging of the mobile terminal 200 according to the charging start signal received from the wired charging module 107a, and transmit a connection request to the mobile terminal 200 in a wired or wireless manner.

In response to the connection request received from the display device 100, the mobile terminal 200 can transmit a connection response including information indicating a screen state of the mobile terminal 200 to the display device 100. The display device 100 can thus determine whether the screen of the mobile terminal 200 is in a turned-on/off state based on the connection response received from the mobile terminal 200.

When that the display device 100 determines the screen of the mobile terminal 200 is in the turned-on state, the display device 100 can transmit a screen mirroring request to the mobile terminal 200. The mobile terminal 200 can then transmit image data corresponding to an image 410 being displayed on the screen to the display device 100 in response to the received screen mirroring request. The display device 100 can thus display a mirrored image 420 on the display 151 based on the received image data.

Next, FIG. 4B illustrates the cradle 107 of the display device 100 including a wireless charging module 107b for wireless charging. In particular, the wireless charging module 107b can generate a charging start signal when the mobile terminal 200 is placed on the cradle 107 or when power can be transferred to the mobile terminal 200.

The processor 180 of the display device 100 can detect the start of charging of the mobile terminal 200 according to the charging start signal received from the wired charging module 107a, and transmit a connection request to the mobile terminal 200 in a wired or wireless manner. The subsequent procedure is as described with reference to FIG. 4A.

As described above, the user can conveniently view the mobile terminal image on the display device 100 having a larger screen only by placing the mobile terminal 200 on the cradle 107. In addition, the procedure for screen mirroring is simplified, thus greatly improving the user's convenience.

Next, FIG. 4C illustrates information indicating that the screen of the mobile terminal 100 is turned off is included in the connection response transmitted to the display device 100 by the mobile terminal 200. When the screen of the mobile terminal 200 is turned off, the processor 180 of the display device 100 can transmit a notification inquiring whether to perform screen mirroring to the mobile terminal 200. As shown in FIG. 4C, the mobile terminal 200 can also display a pop-up window 430 inquiring whether to perform screen mirroring based on the notification received from the display device 100.

When an OK button 431 included in the pop-up window 430 is selected, the mobile terminal 200 can transmit image data corresponding to an image being displayed to the display device 100. As another example, the mobile terminal 200 can output a voice notification inquiring whether to perform screen mirroring through a speaker. The mobile terminal 200 can transmit image data corresponding to an image being displayed to the display device 100 when receiving a voice permitting performance of screen mirroring from the user.

Figure 5:
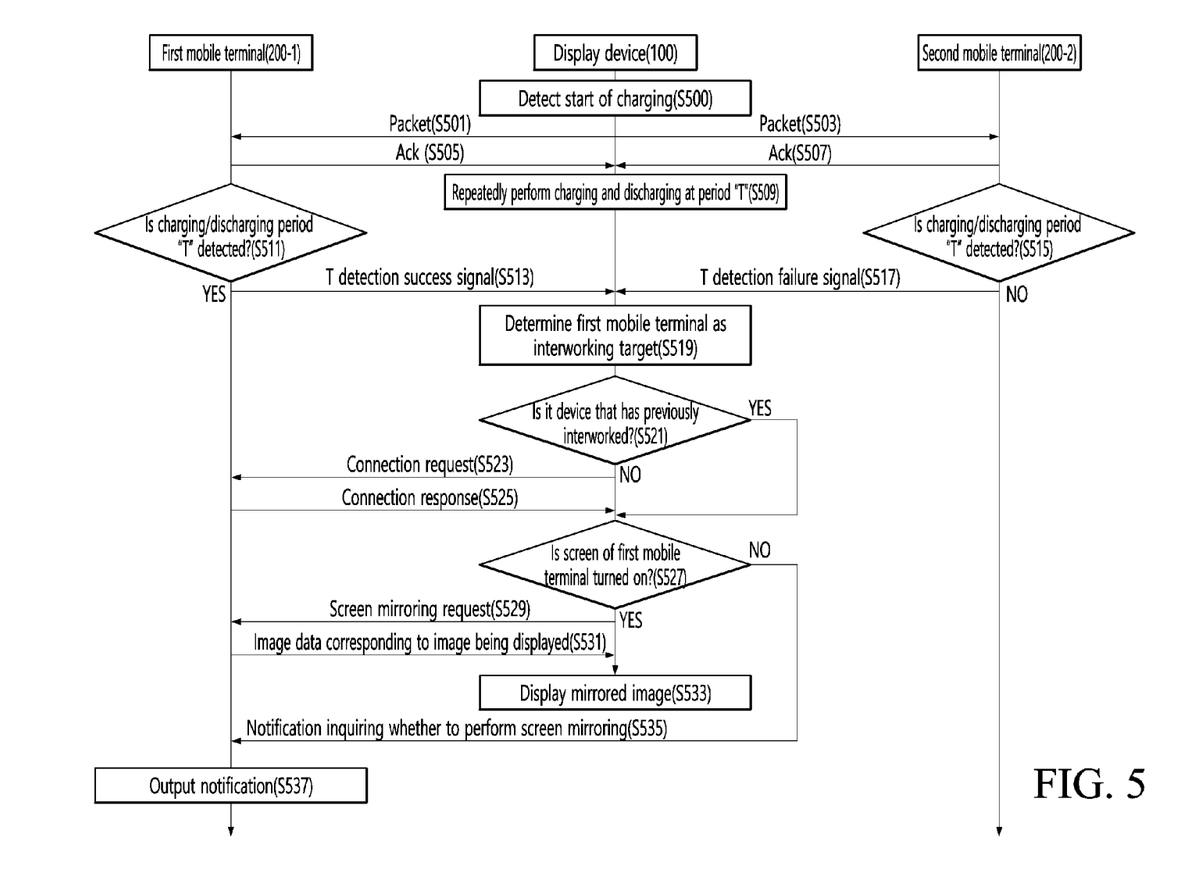
FIG. 5 is a ladder diagram illustrating a method of operating a system according to another embodiment of the present disclosure.

Next, FIG. 5 is a ladder diagram illustrating a method of operating a system according to another embodiment of the present disclosure. In particular, FIG. 5 illustrates determining, as an interworking target, any one of a plurality of mobile terminals 200-1 and 200-2 that have not previously been interlocked with the display device 100 based on a charge/discharge period.

In the following embodiment, two mobile terminals will be described as an example, but the present disclosure is not limited thereto, and the embodiment may be applied even when three or more mobile terminals exist. As shown in FIG. 5, the processor 180 of the display device 100 can detect the start of charging through a charging module 107 (S500).

The processor 180 of the display device 100 can then individually broadcast a packet including a specific period T to the first mobile terminal 200-1 and the second mobile terminal 200-2 through the communication interface 110 (S501, S503). In an embodiment, the specific period can be a charging/discharging period taken for the display device 100 to start charging the mobile terminal through the charging module 107 and then for the mobile terminal to be discharged.

The processor 180 can transmit a packet including a specific period to the first and second mobile terminals 200-1 and 200-2 existing in the same network by using a broadcasting method. The processor 180 of the display device 100 can also receive an Ack signal from each of the first mobile terminal 200-1 and the second mobile terminal 200-2 through the communication interface 110 (S505, S507).

Each of the mobile terminals can identify the specific period included in the packet received from the display device 100 and transmit the Ack signal to the display device 100. The Ack signal is a response signal indicating that the packet has been received. The Ack signal can include screen state information indicating whether the screen of the mobile terminal is turned on or off.

The processor 180 of the display device 100 can repeatedly perform charging and discharging at period "T" (S509) through the charging module 107. Further, the processor 180 can repeatedly perform charging and discharging in period "T" in order to detect a mobile terminal with a charging/discharging period matching the charging/discharging period of the charging module 107 among the plurality of mobile terminals 200-1 and 200-2. Accordingly, the charging/discharging period of the mobile terminal that is charged through the charging module 107 of the display device 100 can also be detected as "T".

When the first mobile terminal 200-1 detects "T" as the charge/discharge period (Yes in S511), the first mobile terminal 200-1 transmits a T detection success signal (S513). That is, when the charging/discharging period of the first mobile terminal 200-1 is "T", the first mobile terminal 200-1 can transmit, to the display device 100, the T detection success signal indicating that the charging/discharging period is detected as the "T".

When the second mobile terminal 200-2 does not detect "T" as the charge/discharge period (No in S515), the second mobile terminal 200-2 can transmit a T detection failure signal to the display device 100 (S517). When the charge/discharge period is not "T", the second mobile terminal 200-2 can transmit the T detection failure signal to the display device 100.

When the T detection failure signal is received, the display device 100 can ignore the T detection failure signal. That is, the mobile terminal that has transmitted the "T" detection failure signal can be excluded from an interworking target. In addition, the processor 180 of the display device 100 can determine the first mobile terminal 200-1 that has transmitted the "T" detection success signal as an interworking target (S519).

That is, the processor 180 can determine, as an interworking target, the first mobile terminal 200-1 that has transmitted the "T" detection success signal among the plurality of mobile terminals 200-1 and 200-2 being charged. The processor 180 of the display device 100 can determine whether the determined first mobile terminal 200-1 is a device that has previously interworked with the display device 100 (S521).

The processor 180 can determine whether the determined first mobile terminal 200-1 is a device that has previously interworked with the display device 100, based on interworking history information including identification information of a device that has interworked with the display device 100 in the past. The identification information of the device identifies the device, such as a model name of the device and a name of the device. The processor 180 of the display device 100 can transmit a connection request to the first mobile terminal 200-1 when the first mobile terminal 200-1 is not determined as a device with which the display device 100 has previously interworked (No in S521 and S523).

In an embodiment, the connection request is a request for preparing a connection to exchange content data with the first mobile terminal 200-1. The processor 180 of the display device 100 can receive a connection response in response to the connection request through the communication interface 110 (S525). The connection response is a response allowing the first mobile terminal 200-1 to connect with the display device 100.

When a connection response is received from the first mobile terminal 200-1 or when the first mobile terminal 200-1 is determined as a device with which the display device 100 has previously interworked, the processor 180 of the display device 100 can determine whether the screen of the mobile terminal 200-1 is turned on (S527). The processor 180 can determine whether the screen of the first mobile terminal 200-1 is turned on based on the screen state information included in an Ack signal received in step S505.

As another example, the connection response of step S525 can also include screen state information of the first mobile terminal 200-1. That is, the processor 180 can determine whether the screen of the first mobile terminal 200-1 is turned on based on the screen state information of the first mobile terminal 200-1 which is included in the connection response.

When the screen of the first mobile terminal 200-1 is determined to be turned on (Yes in S527), the processor 180 of the display device 100 can transmit a mirroring request to the first mobile terminal 200-1 through the communication interface 110 (S529). The processor 180 of the display device 100 can receive image data corresponding to an image being displayed by the first mobile terminal 200-1 in response to the screen mirroring request through the communication interface 110 (S531).

The processor 180 of the display device 100 can display a mirrored image on the display 151 based on the received image data (S533). When the screen of the first mobile terminal 200-1 is determined to be turned off, the processor 180 of the display device 100 can transmit a notification inquiring whether to perform screen mirroring to the first mobile terminal 200-1 (No in S521 and S535).

The first mobile terminal 200-1 can output the notification received from the display device 200 (S537). According to the embodiment of the present disclosure as described above, the display device 100 can determine a mobile terminal matching the display device's charge/discharge period among a plurality of mobile terminals as an interworking target, and automatically interwork with the determined mobile terminal. Accordingly, it is possible to omit a process in which the user needs to approve for interworking with the mobile terminal, thus greatly improving user convenience.

Figure 6:
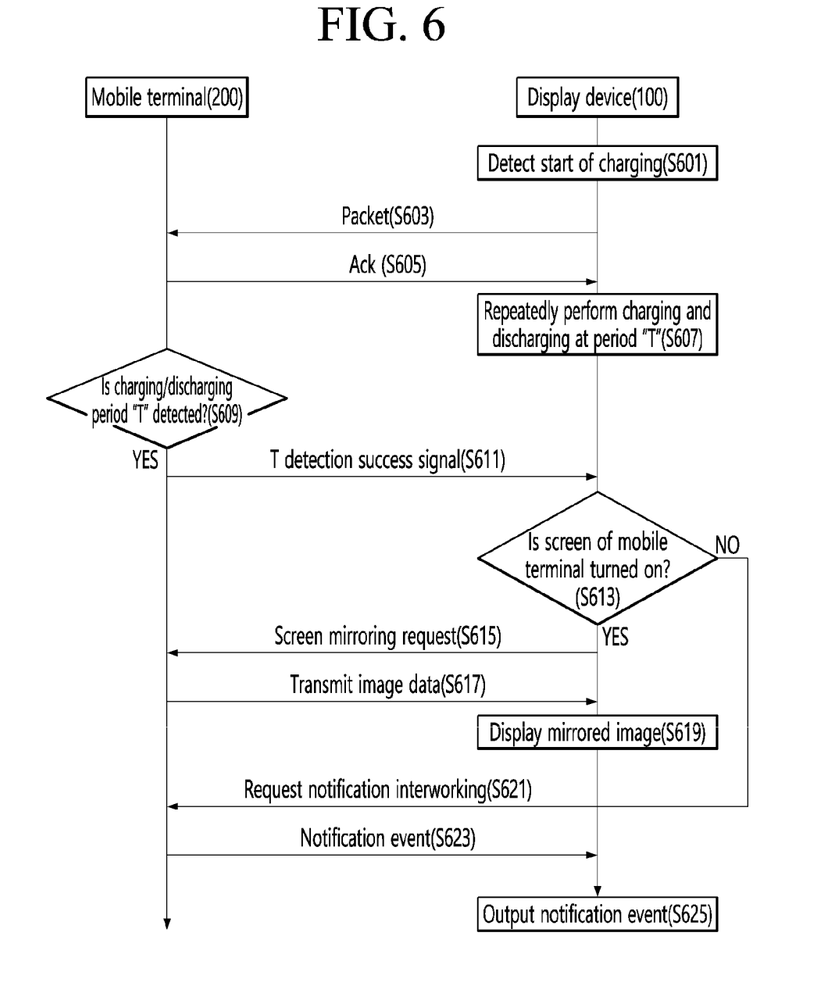
FIG. 6 is a ladder diagram illustrating a method of operating a system according to another embodiment of the present disclosure.

Next, FIG. 6 is a ladder diagram illustrating a method of operating a system according to another embodiment of the present disclosure. In particular, FIG. 6 illustrates a process of detecting the start of charging of a mobile terminal, which has previously interworked with a display device, and performing automatic interworking with the mobile terminal.

Referring to FIG. 6, the processor 180 of the display device 100 can detect the start of charging through the charging module 107 (S601). The processor 180 of the display device 100 can then transmit a packet including a specific period T to the mobile terminal 200 through the communication interface 110 (S603).

Further, the processor 180 of the display device 100 can receive an Ack signal from the mobile terminal 200 through the communication interface 110 (S605). The processor 180 of the display device 100 can also repeatedly perform charging and discharging at a time period T through the charging module 107 (S607).

When the mobile terminal 200 detects "T" at the charge/discharge period (S609), the mobile terminal 200 can transmit a T detection success signal to the display device 100 (S611). The processor 180 of the display device 100 can also determine whether the screen of the mobile terminal 200 is turned on as the T detection success signal is received from the mobile terminal 200 (S613).

When the screen of the mobile terminal 200 is determined to be turned on (Yes in S613), the processor 180 of the display device 100 can transmit a mirroring request to the mobile terminal 200 through the communication interface 110 (S615). The processor 180 of the display device 100 can also receive image data corresponding to an image being displayed by the mobile terminal 200 in response to the screen mirroring request through the communication interface 110 (S617).

Further, the processor 180 of the display device 100 can display a mirrored image on the display 151 based on the received image data (S619). When the screen of the mobile terminal 200 is determined not to be turned on (No in S613), the processor 180 of the display device 100 can transmit a notification interworking request through the communication interface 110 (S621).

The notification interworking request can be a request for the display device 100 to receive a notification event received by the mobile terminal 200. The notification event may be any one of a text message received by the mobile terminal 200, a notification received through an SNS service, and a call signal. As another example, when the screen of the mobile terminal 200 is turned off, the processor 180 can transmit a notification inquiring whether to perform screen mirroring to the mobile terminal 200.

When receiving the notification, the mobile terminal 200 can transmit the received notification to the display device 100 (S623). The processor 180 of the display device 100 can output the received notification through the display 151 or the sound output unit 152 (S625). According to an embodiment of the present disclosure as described above, the user can easily perform interworking with the mobile terminal 200 that has previously interlocked with display device 100 without a complicated interworking process through the display device 100.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device comprising:
a display;
a wireless communication interface configured to perform communication with a mobile terminal;
a charging module configured to charge the mobile terminal, and generate a charging start signal of the mobile terminal; and
a processor configured to:
detect the charging start signal of the mobile terminal through the charging module,
receive a screen state of the mobile terminal from the mobile terminal through the wireless communication interface based on detection of the charging start signal,
determine whether a screen of the mobile terminal is turned on or turned off, based on the received screen state,
if the screen of the mobile terminal is determined to be on, transmit a screen mirroring request to the mobile terminal through the wireless communication interface, receive, from the mobile terminal, image data corresponding to an image being displayed by the mobile terminal through the wireless communication interface, in response to the screen mirroring request, and display a mirrored image on the display based on the received image data, and
if the screen of the mobile terminal is determined to be off, transmit a screen mirroring notification to the mobile terminal inquiring whether to perform screen mirroring through the wireless communication interface to the mobile terminal.

2. The display device of claim 1, wherein the processor is configured to transmit a short-range communication connection request to the mobile terminal requesting short-range communication with the mobile terminal after detecting the charging signal of the mobile terminal and before determining whether the screen of the mobile terminal is turned on or turned off.

3. The display device of claim 2, wherein the processor is configured to receive a connection response from the mobile terminal including the screen state from the mobile terminal in response to the short-range communication connection request.

4. The display device of claim 1, wherein the processor is configured to transmit, to the mobile terminal, a notification event transmission request requesting provision of an external notification event through the wireless communication interface by the mobile terminal, when the processor determines the screen of the mobile terminal is turned off.

5. The display device of claim 1, further comprising:
a stand base configured to support the display device;
a head configured to comprise the display and a back cover configured to cover a periphery of the display;
a shaft configured to connect the back cover and the stand base, wherein the upper portion of the shaft faces the peripheral portion of the head in a horizontal direction; and
a cradle configured to extend from the shaft.

6. The display device of claim 5, wherein the charging module is provided in the cradle, and
wherein the processor is configured to receive a charging start signal indicating a flow of current from the charging module, and detect the start of the charging of the mobile terminal based on the charging start signal.

7. The display device of claim 5, wherein the base comprises wheels for moving the display device.

8. The display device of claim 5, wherein the shaft extends vertically and a lower end of the shaft is connected to an edge of the stand base.

9. The display device of claim 8, wherein the lower end of the shaft is rotatably connected to the edge of the stand base so the head and the shaft are rotatable about an axis perpendicular to the stand base.

10. The display device of claim 9, wherein an upper portion of the shaft is connected to a peripheral portion of the head and faces the peripheral portion of the head in a horizontal direction.

11. The display device of claim 10, wherein a horizontally protruding connection pin is formed in the upper portion of the shaft and connected to the peripheral portion of the head so the head is tiltable about a horizontal axis corresponding to the connection pin.

12. The display device of claim 5, wherein the cradle extends horizontally from the shaft 103 and is horizontally disposed.

13. The display device of claim 5, wherein a height from the stand base to the cradle is lower than a height from the stand base to the head.

14. The display device of claim 5, wherein the cradle is positioned opposite the head with respect to the shaft.

15. The display device of claim 5, wherein the head is connected to one side of the shaft, and the cradle is connected to the other side of the shaft.

16. The display device of claim 1, wherein the processor is configured to:
transmit a packet including a specific period to a plurality of mobile terminals through the wireless communication interface,
repeatedly perform charging and discharging of the mobile terminals at the specific period through the charging module, and
determine a mobile terminal that has transmitted a detection success signal indicating that the specific period has been detected as an interworking target device when receiving the detection success signal from any one of the plurality of mobile terminals through the wireless communication interface.

17. The display device of claim 16, wherein the processor is configured to ignore a detection failure signal indicating that the specific period is not detected when the detection failure signal is received.

18. The display device of claim 16, wherein the specific period is a charging/discharging period of the charging module used to determine a mobile terminal being charged through the charging module among the plurality of mobile terminals.

19. The display device of claim 16, wherein the processor is configured to receive an Ack signal in response to transmission of the packet from each of the plurality of mobile terminals, the Ack signal including a screen state of each mobile terminal.

20. The display device of claim 16, wherein the processor is configured to transmit the screen mirroring request to the determined mobile terminal when the determined mobile terminal is a device that has interworked with the display device, based on an interworking history.

* * * * *